US011374235B2

(12) United States Patent
Ghezel-Ayagh

(10) Patent No.: US 11,374,235 B2
(45) Date of Patent: Jun. 28, 2022

(54) FUEL CELL ANODE FLOW FIELD DESIGN CONFIGURATIONS FOR ACHIEVING INCREASED FUEL UTILIZATION

(71) Applicant: FuelCell Energy, Inc., Danbury, CT (US)

(72) Inventor: Hossein Ghezel-Ayagh, New Milford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 69 days.

(21) Appl. No.: 16/696,310

(22) Filed: Nov. 26, 2019

(65) Prior Publication Data

US 2020/0099066 A1 Mar. 26, 2020

Related U.S. Application Data

(63) Continuation of application No. PCT/US2018/025461, filed on Mar. 30, 2018.
(Continued)

(51) Int. Cl.
*H01M 8/0254* (2016.01)
*H01M 8/026* (2016.01)
(Continued)

(52) U.S. Cl.
CPC ....... *H01M 8/0254* (2013.01); *H01M 8/0206* (2013.01); *H01M 8/026* (2013.01);
(Continued)

(58) Field of Classification Search
CPC ............ H01M 8/0254; H01M 8/0206; H01M 8/0215; H01M 8/026; H01M 8/0276;
(Continued)

(56) References Cited

U.S. PATENT DOCUMENTS 4,511,636 A * 4/1985 Vogel .................... H01M 8/142
429/478
6,808,839 B2 * 10/2004 Tsuyoshi ............. H01M 8/2457
429/458
(Continued)

FOREIGN PATENT DOCUMENTS

JP 63-190255 A 8/1988
JP 02-170363 A 7/1990

OTHER PUBLICATIONS

International Search Report and Written Opinion in PCT/US2018/025461 dated Jun. 11, 2019 (10 pages).

*Primary Examiner* — Ula C Ruddock
*Assistant Examiner* — Mary Grace Byram
(74) *Attorney, Agent, or Firm* — Foley & Lardner LLP

(57) ABSTRACT

An anode of a fuel cell has an anode current collector defining an inlet configured to receive fuel gas and an outlet configured to output the fuel gas, a barrier that divides an active area of the anode current collector into a first area and a second area, and a flow passage configured to allow a flow of fuel gas from the inlet through the first area and the second area to the outlet. An obstacle is located in the flow passage in an inactive area of the anode current collector and is configured to change a flow direction of the fuel gas in the flow passage from the first area to the second area to achieve intra-cell mixing of the fuel gas.

14 Claims, 18 Drawing Sheets

Related U.S. Application Data

(60) Provisional application No. 62/513,317, filed on May 31, 2017.

(51) Int. Cl.
    *H01M 8/2485*      (2016.01)
    *H01M 8/0276*      (2016.01)
    *H01M 8/0206*      (2016.01)
    *H01M 8/0215*      (2016.01)
    *H01M 8/14*      (2006.01)
    *H01M 8/0258*      (2016.01)

(52) U.S. Cl.
    CPC ....... *H01M 8/0215* (2013.01); *H01M 8/0258* (2013.01); *H01M 8/0276* (2013.01); *H01M 8/145* (2013.01); *H01M 8/2485* (2013.01); *H01M 2008/147* (2013.01); *H01M 2300/0051* (2013.01)

(58) Field of Classification Search
CPC .. H01M 8/145; H01M 8/2485; H01M 8/0258; H01M 2008/147; H01M 2300/0051
See application file for complete search history.

(56) References Cited

U.S. PATENT DOCUMENTS

| | | | |
|---|---|---|---|
| 2005/0133568 A1* | 6/2005 | Sigler | H01M 8/0276 228/157 |
| 2007/0231659 A1* | 10/2007 | Ma | H01M 8/0282 429/444 |
| 2015/0333357 A1* | 11/2015 | Hashimoto | H01M 8/04089 429/458 |

* cited by examiner

FUEL CELL ANODE FLOW FIELD DESIGN CONFIGURATIONS FOR ACHIEVING INCREASED FUEL UTILIZATION

CROSS-REFERENCE TO RELATED PATENT APPLICATIONS

This application is a Continuation of International Application No. PCT/US2018/025461, filed Mar. 30, 2018, which claims the benefit of and priority to U.S. Provisional Application No. 62/513,317, filed May 31, 2017. The entire disclosures of the foregoing applications are hereby incorporated by reference herein.

BACKGROUND

The present disclosure relates to fuel cell systems. In particular, the present disclosure relates to a fuel cell system design that is intended to reconfigure a fuel cell stack geometry and associated gas flow fields to achieve high fuel utilization.

A fuel cell is a device which uses an electrochemical reaction to convert chemical energy stored in a fuel such as hydrogen or methane into electrical energy. In general, fuel cells include an anode to catalytically react with the fuel and a cathode in fluid communication with an oxidant such as air.

Fuel cells are typically arranged in a stacked relationship. A fuel cell stack includes many individual cells positioned between a fixed end plate and a free end plate. One fuel cell stack configuration includes an externally manifolded stack, wherein the fuel cell stack is left open on its sides and a fluid such as a fuel or oxidant is delivered by way of manifolds sealed to peripheral portions of respective sides of the fuel cell stack. The manifolds thus provide sealed passages for delivering the fuel and the oxidant gases to the fuel cells and directing the flow of such gases in the stack, thereby preventing those gases from leaking either to the environment or to the other manifolds. Such manifolds are typically used in Molten Carbonate Fuel Cells (MCFC) which operate at approximately 550-650° C. During operation of MCFCs, the fuel cells can move relative to the manifolds.

Conventional fuel cells typically include an anode and a cathode separated by an electrolyte contained in an electrolyte matrix. The anode, the cathode, the electrolyte and the electrolyte matrix are disposed between a first collector and a second collector, with the first collector adjacent the anode and the second collector adjacent the cathode. Fuel flows to the anode via the first collector and an oxidant flows to the cathode via the second collector. The fuel cell oxidizes the fuel in an electrochemical reaction which releases a flow of electrons between the anode and cathode, thereby converting chemical energy into electrical energy.

The fuel cells described above can be stacked in series with separator plates disposed between adjacent fuel cells and end plates (e.g., a fixed end plate and a free end plate) disposed on opposing ends of the fuel cell stack. Fuel cells are stacked to increase the electrical energy they produce. Fuel cell stacks have a negative side with a negative end cell and a positive side with a positive end cell.

Efficiency of a fuel cell (and a fuel cell power plant) is directly proportional to the amount of fuel utilized within the fuel cell anode. New variants of MCFC fuel cell systems require increased fuel utilization for achieving higher conversion of the fuel to electricity, and as such higher efficiencies. In addition, to control the uniformity of flow of fuel (anode gas) to each cell in the fuel cell stacks, the gas flow rate through the manifold and the location of the gas flow exits have to be carefully considered.

A need exists for improved technology, including technology related to mixing a reactant gas within a fuel cell of a fuel cell stack to provide a uniform concentration of the reactant gas and a uniform temperature of the reactant gas across the fuel cell.

SUMMARY

In some embodiments, an anode for a fuel cell comprises an anode current collector defining an inlet configured to receive fuel gas; an outlet configured to output the fuel gas; and a flow passage configured to allow a flow of fuel gas from the inlet to the outlet. An obstacle is located in the flow passage and configured to change a flow direction of the fuel gas in the flow passage to achieve intra-cell mixing of the fuel gas.

In some aspects of the anode, the anode current collector further comprises a barrier that divides an active area of the anode current collector into a first area and a second area, and the flow passage is configured such that the fuel gas flows from the first area to the second area. The barrier may be made of ceramic paste or metal. The barrier may be a hermetic seal.

In some aspects of the anode, the inlet and the outlet are separately provided at a first end of the anode current collector such that the fuel gas enters and exits the anode current collector at the first end. The obstacle comprises a wall at the second end of the anode current collector opposite to the first end of the anode current collector. The obstacle may be located in an inactive area of the anode current collector.

In some aspects of the anode, the obstacle comprises at least one baffle configured to create an undulating flow path within the flow passage. The obstacle may comprise a plurality of baffles. In aspects in which the obstacle comprises a plurality of baffles, each of the baffles may a same size and shape, or at least one of the baffles may have a different size or shape than another baffle. In aspects in which the obstacle comprises a plurality of baffles, the baffles may be equidistant, or a spacing between a first pair of adjacent baffles (e.g., a first baffle and a second baffle) may be different from a spacing between a second pair of adjacent baffles (e.g., the second baffle and a third baffle).

In some aspects of the anode, the anode current collector comprises a plurality of rows of corrugations separated by channels. Catalyst pellets may be disposed within at least some of the corrugations. In aspects in which the obstacle comprises at least one baffle, the baffle may be interwoven with the corrugations or disposed in at least one of the channels.

In some aspects of the anode, the obstacle comprises at least one baffle. The baffle may be formed of a ceramic paste or a metal strip. In other examples, the baffle may be a baffle flap formed from a bent portion of the anode current collector. The shape, size, orientation, or distance between baffles may be altered to obtain a desired gas flow pattern, such as a step, wave or zig-zag flow pattern across the anode current collector.

In some embodiments, a fuel cell includes the anode of any of the embodiments or aspects described above, a cathode, and an ion-conducting electrolyte sandwiched between the anode and the cathode. The fuel cell may be a high temperature fuel cell such as a molten carbonate fuel cell.

In some embodiments, a method of supplying fuel gas to a fuel cell includes supplying the fuel gas to an inlet defined by an anode current collector; flowing the fuel gas through a flow passage defined by the anode current collector; changing a flow direction of the fuel gas within the anode current collector via an obstacle provided in the anode current collector to achieve intra-cell mixing of the fuel gas; and outputting the fuel gas from an outlet defined by the anode current collector.

In some aspects of the method, the obstacle comprises a wall at a second end of the anode current collector opposite to a first end at which the inlet is located, and changing the flow direction of the fuel gas comprises redirecting the fuel gas from flowing in a first direction from the first end to the second end, to flowing in a second direction from the second end to the first end.

In some aspects of the method, the obstacle comprises at least one baffle, and changing the flow direction of the fuel gas comprises creating an undulating flow path within the flow passage.

One of ordinary skill in the art would appreciate that the aspects described above are not mutually exclusive and may be combined. Any reference above to an anode portion and an anode gas may be substituted for a cathode portion and a cathode gas, respectively.

These and other advantageous features will become apparent to those reviewing the disclosure and drawings.

BRIEF DESCRIPTION OF THE DRAWINGS

The details of one or more implementations of the subject matter described in this specification are set forth in the accompanying drawings and the description below. Other features and aspects of the subject matter will become apparent from the description, the drawings, and the claims presented herein

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1A:
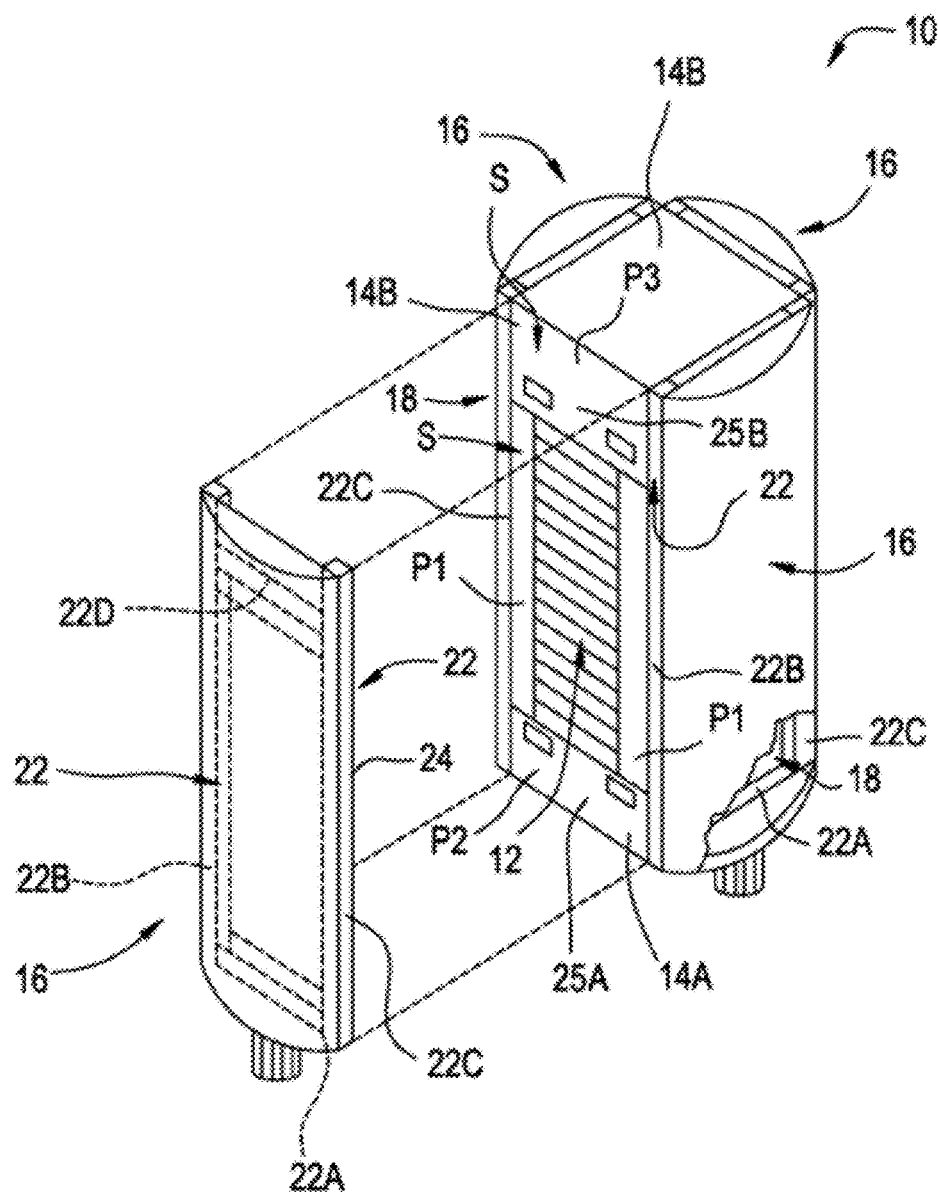
FIG. 1A is a perspective view of a fuel cell system including a fuel cell stack with three manifolds secured thereto and one manifold disassembled therefrom.
Figure 1B:
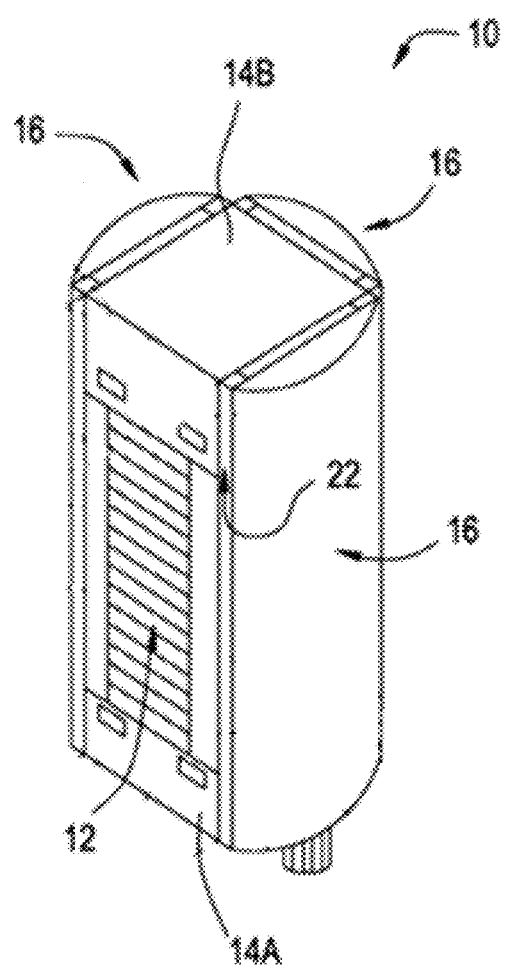
FIG. 1B is a perspective view of a fuel cell system including a fuel cell stack with three manifolds secured thereto. In this example, the fourth side is formed by an enclosure encasing the stack (not shown) such that cathode inlet gas within the enclosure envelopes the entire stack.

Referring to FIGS. 1A and 1B, a fuel cell system, generally designated by the numeral 10 includes a Molten Carbonate Fuel Cell (MCFC) stack 12 positioned between opposing end plates 14A and 14B. Each of the fuel cells in the stack 12 includes an anode and a cathode.

In the example of FIG. 1A, a fuel cell system 10, including a fuel cell stack 12, is provided showing a manifold 16 positioned on three of four outwardly facing surfaces 18 of the fuel cell system 10 for directing a fluid such as fuel (i.e., anode gas) or an oxidant (i.e., cathode gas) into or out of the fuel cell stack. One of the manifolds 16 is shown removed from the outwardly facing surface 18 to illustrate the fuel stack 12 and outwardly facing surface 18. When assembled, all four manifolds 16 are positioned on one of the respective outwardly facing surfaces 18. A generally rectangular sealing area S extends around a peripheral portion of each of the outwardly facing surfaces 18. The sealing area S is defined by a peripheral area P1 of the fuel cell stack and portions P2 and P3 of the end plates 14A and 14B, respectively. Each of the manifolds 16 has a portion thereof secured or tethered to a portion of the portion P2 of the end plate 14A. For example, movement of the manifolds 16 may be limited via a bracket that has a clearance of about ±⅛". During operation of the fuel cell system 10, each of the manifolds 16 is moveable relative to the portions P1 and P3 of the respective sealing area S, for example, parallel to the X, Y and/or Z axes.

The fuel cell system 10 of FIG. 1B is structurally the same as the fuel cell system 10 of FIG. 1A, except that the fuel cell system 10 of FIG. 1B only includes three manifolds 16. In the example of FIG. 1B, the fourth side is formed by an enclosure (not shown) encasing the fuel cell system 10 itself, as opposed to a separate manifold, such that cathode inlet gas envelops the entire fuel cell system 10 (including fuel cell stack 12). For clarity, some of the structural details have been omitted from FIG. 1B, but are described with respect to FIG. 1A.

While in the examples above the fuel cell system 10 is described as having four outwardly facing surfaces 18, with each having a generally rectangular sealing area S, the concepts disclosed in the present application are not necessarily limited in this regard. While the fuel cell system 10 is described as including a MCFC stack, the concepts disclosed herein may be employed on fuel cell systems having other types of fuel cell stacks.

Each of the manifolds 16 includes a manifold seal. Each manifold seal includes a manifold frame 22 defining a mating surface 24. The mating surface 24 sealingly engages the sealing area S. The manifold frame 22 is manufactured from four sections 22A, 22B, 22C and 22D of a dielectric material to prevent electrical short circuiting between individual cells of the fuel cell stack 12. One section 22A of each of the manifold frames 22 is secured to the outwardly facing surface 25A of the end plate 14A to restrain movement of the section 22A in a direction along the Z axis. The end plate 14A is fixed to a support structure (not shown). The manifold seal 20 also includes a gasket formed into a shape that is complementary to the manifold frame 22 and disposed between the mating surface 24 and the sealing area S.

While the manifold frame 22 is described as being manufactured from four sections of a dielectric material, the concepts disclosed herein are not limited in this regard as other materials can also be employed and the manifold frame and/or sections 22A, 22B, 22C and 22D can be manufactured in any number of sections without departing from the broader aspects of concepts disclosed herein. For example, the manifold frame 22 may be metal with separate, dielectric components mounted to the metal frame. Moreover, there may be many sections of dielectric material on a single manifold frame 22, and therefore, the presently disclosed concepts are not limited to only four sections of dielectric material.

In large stacks of fuel cells, for example, stacks having 100 fuel cells or more, reactants such as fuel gas (anode gas) or oxidant gas (cathode gas) move and develop a profile of various concentration and/or non-uniform temperature across the stack, from an inlet to an outlet of the stack. As a result, the current distribution across the stack is non-uniform as the reactant travels through the stack. Thus, in the case of fuel gas, large fuel cell stacks are often prevented from achieving a high fuel utilization, for example, a fuel utilization above 60%.

High temperature fuel cells, such as solid oxide fuel cells or molten carbonate fuel cells, comprise an ion-conducting electrolyte sandwiched between a cathode and an anode. Fuel cells operate by passing a reactant fuel gas through the anode, while passing oxidizing gas through the cathode. In a solid oxide fuel cell, oxygen combines with electrons at the cathode to form oxygen ions, which are conducted through the ion-conducting ceramic electrolyte to the anode. At the anode, oxygen ions combine with hydrogen and carbon monoxide to form water and carbon dioxide, thereby liberating electrons. In general, a MCFC assembly includes an anode (e.g., a porous nickel anode) and a cathode (e.g., a porous lithiated nickel oxide cathode), separated by an electrolyte matrix storing carbonate electrolyte, such as mixtures of lithium carbonate/potassium carbonate (Li2CO3/K2CO3) or lithium carbonate/sodium carbonate (Li2CO3/Na2CO3). In MCFCs the electrolytes are heated to temperatures in the range of 550-650° C., and the salts melt and conduct carbonate ions (CO3) from the cathode to the anode. At the anode, hydrogen combines with carbonate ions (oxidation) to form water and carbon dioxide, thereby liberating electrons. At the cathode, oxygen combines with carbon dioxide and electrons from the anode (reduction) to produce carbonate ions.

Figure 2:
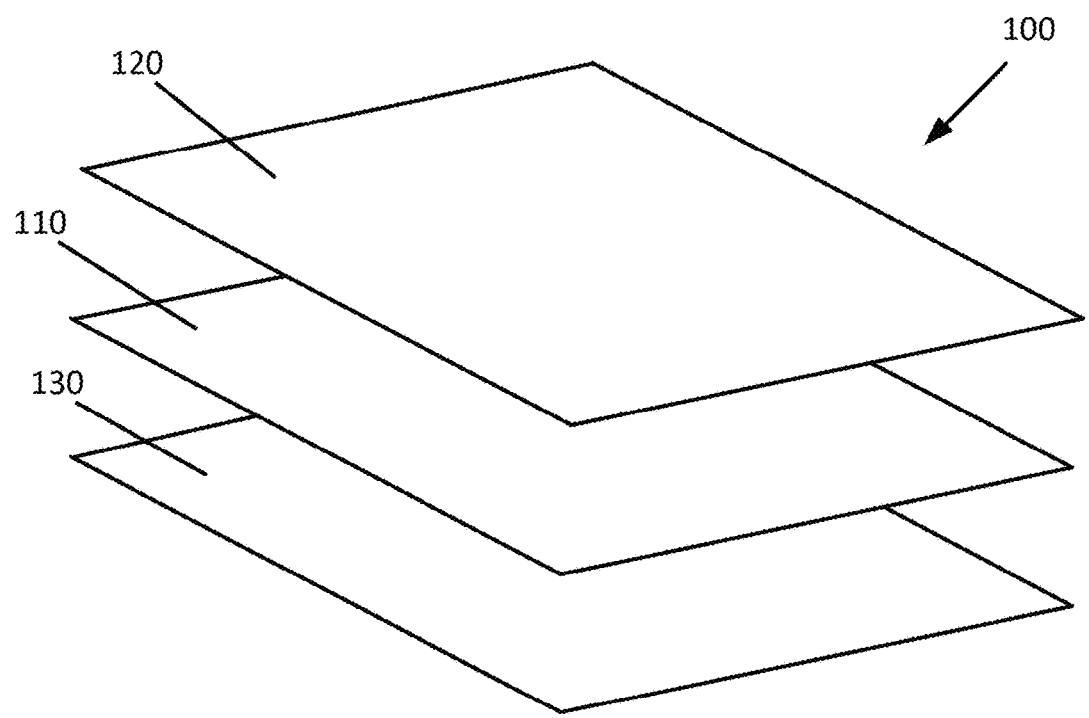
FIG. 2 illustrates a bipolar plate sandwiched between an anode and a cathode.

Referring to FIG. 2, a fuel cell 100 may include a bipolar plate 110 having an anode current collector on one side thereof and a cathode current collector on the other side thereof. The anode current collector and the cathode current collector include flow passages configured for distribution of reactant gases to an anode 120 and a cathode 130, respectively. A "bipolar plate" is a term commonly used for an assembly that includes a separator plate along with a cathode interconnect and anode interconnect positioned on opposite sides of the separator plate. In order to produce a desired power level, a number of individual fuel cells may be stacked in series with a bipolar plate between each cell.

Figure 3:
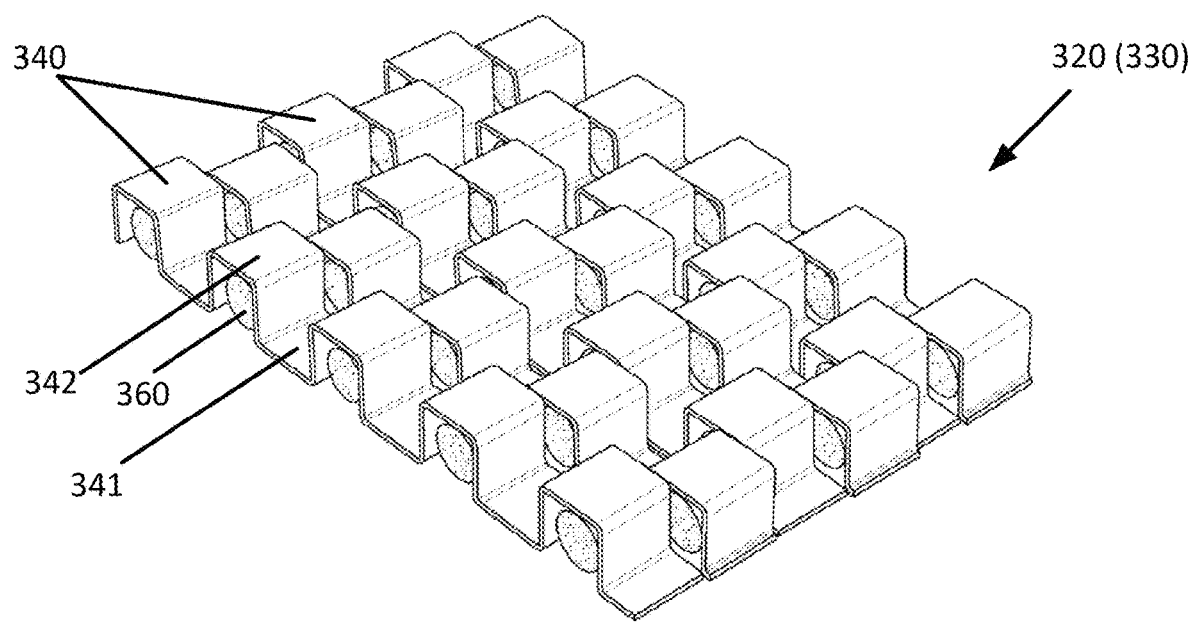
FIG. 3 illustrates a corrugated surface of an anode current collector of an anode flow field or a cathode current collector of a cathode flow field, which are located on opposite sides of the bipolar plate of FIG. 2. The anode current collector may communicate with the anode of FIG. 2. The cathode current collector may communicate with the cathode of FIG. 2.

Referring to FIG. 3, illustrates flow passages for reactant gases included in an anode current collector 320 or a cathode current collector 330. An active area of the anode current collector 320 or an active area of the cathode current collector 330 may include a plurality of corrugations 340 that form recesses 341 and protrusions 342. As used herein, an "active area" refers to an area of the fuel cell in which the electrochemical reaction required to produce electricity take place, and an "inactive area" refers to an area of the fuel cell in which no or an insignificant amount of electrochemical reactions take place. In some aspects, some or all of the corrugations 340 are configured to receive internal reforming catalyst pellets 360, for example, within the protrusions 342. One example of a fuel cell plate structure is described in U.S. Pat. No. 7,740,988, which is hereby incorporated by reference in its entirety.

Figure 11:
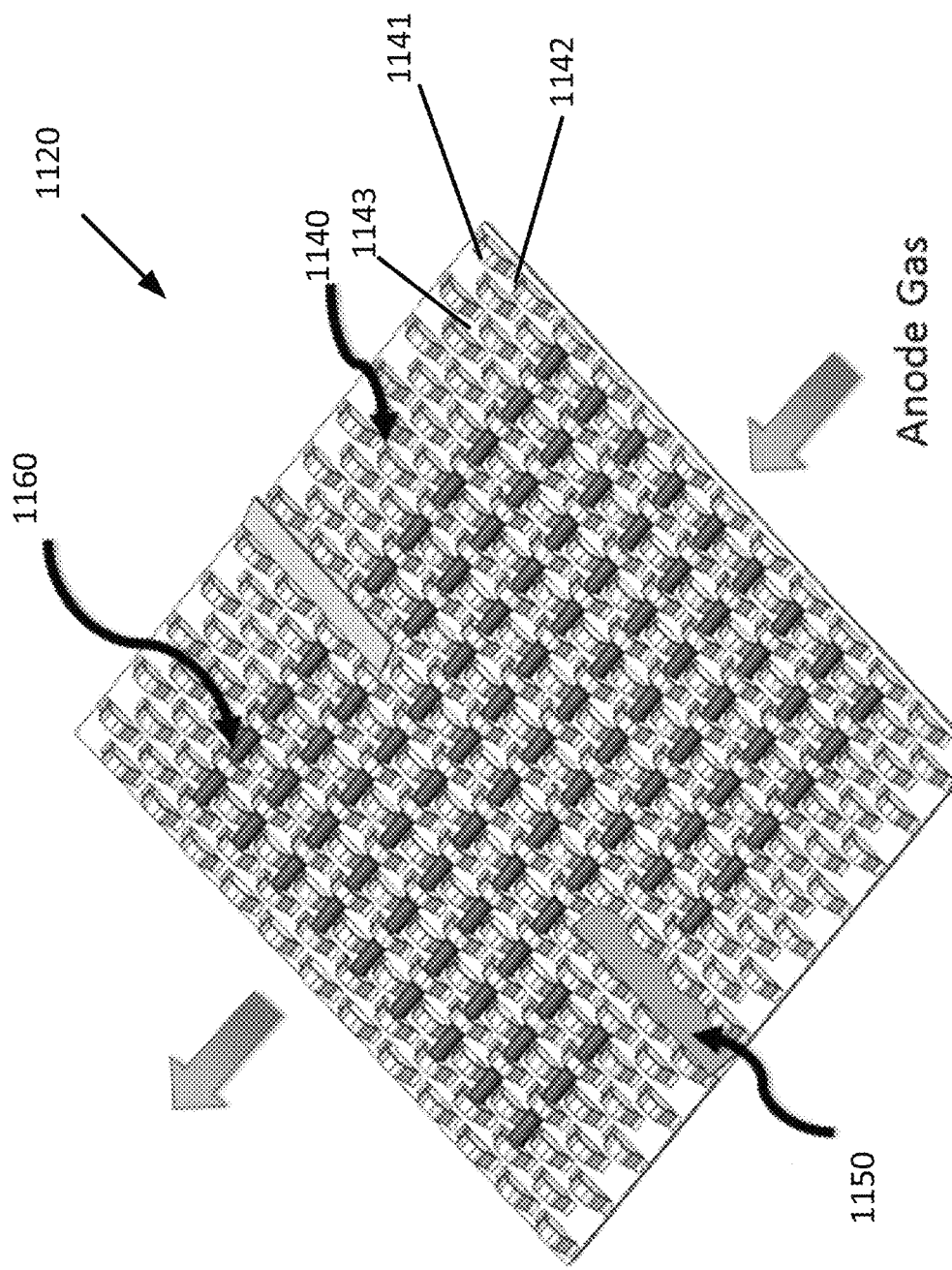
FIG. 11 illustrates a baffle in the form of a flap used to achieve the one-pass flow mixing of FIG. 4B.

Referring to FIG. 11, in another example, an active area of the anode current collector 1120 may include a plurality of corrugations 1140 that form recesses 1141 and protrusions 1142. In some aspects, some or all of the corrugations 1140 are configured to receive internal reforming catalyst pellets 1160, for example, within the recesses 1141. The corrugations 1140 may be provided in a plurality of rows separated by channels 1143. Although FIG. 11 illustrates an anode current collector, the concepts disclosed herein are not limited in this regard. The cathode current collector may include similar structures.

Figure 4A:
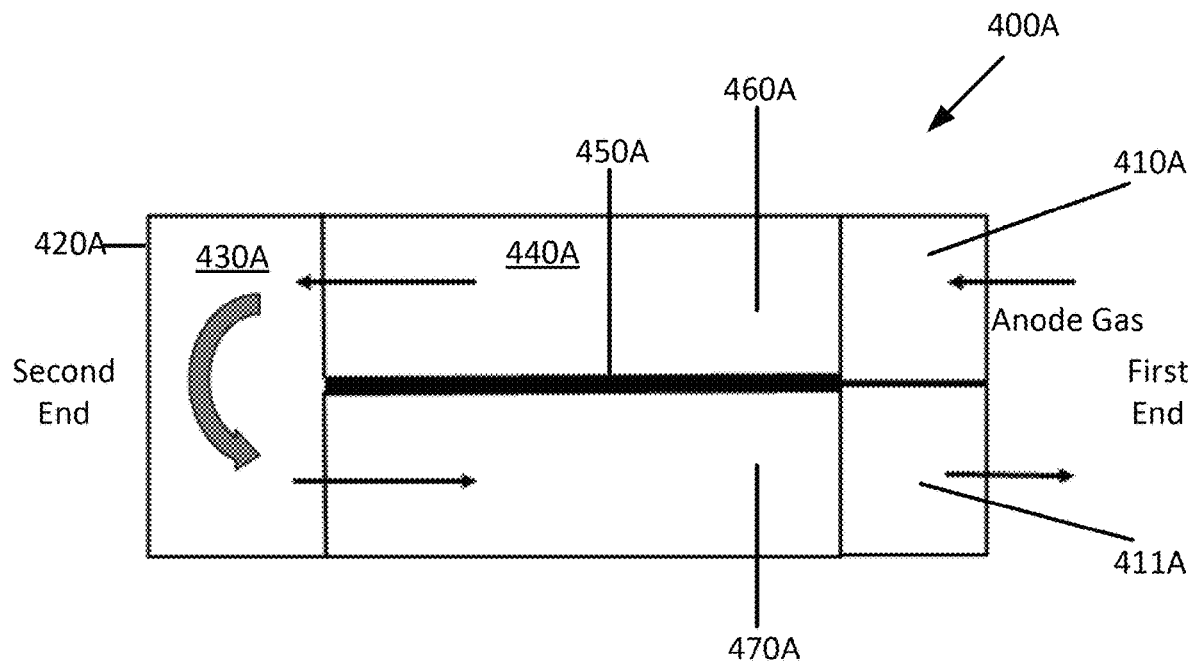
FIG. 4A illustrates a fuel cell in which intra-cell two-pass flow mixing occurs in a fuel cell stack.
Figure 4B:
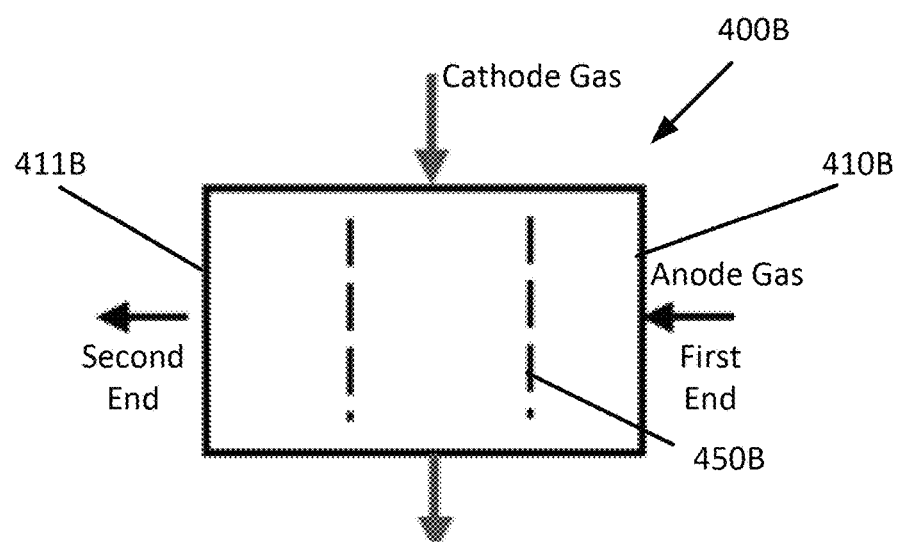
FIG. 4B illustrates a fuel cell in which intra-cell one-pass flow mixing occurs in the fuel cell stack.

Referring now to FIGS. 4A and 4B, two ways for improving the fuel utilization via intra-cell mixing are illustrated. In some embodiments, such as that of FIG. 4A, at least one fuel cell 400A in the stack undergoes intra-cell two-pass flow mixing. In particular, the fuel gas enters an inlet 410A of the fuel cell 400A (an inlet of an anode current collector), travels through the fuel cell 400A in a first direction to a second end of the fuel cell 400A that is opposite to the first end, is turned around/mixed within the fuel cell 400A via an obstacle 420A in an inactive anode area 430A between the second end of the fuel cell 400A and an active anode area 440A, and travels through the fuel cell 400A in a second direction, opposite to the first direction, towards the first end of the fuel cell 400A to an outlet 411A configured to output the fuel gas. In other words, the fuel gas enters and exits the fuel cell 400A on the same side (i.e., the first side). In some aspects, the obstacle 420A may be a wall provided at the second end of the fuel cell 400A. The obstacle 420A is configured to change a flow direction of the fuel gas to achieve intra-cell mixing. A gas pressure of the fuel gas received in the inlet 410A is the motive potential for the flow of the fuel gas through the fuel cell 400A from the inlet 410A, through the bend at the second end of the fuel cell, and to the outlet 411A.

Figure 9:
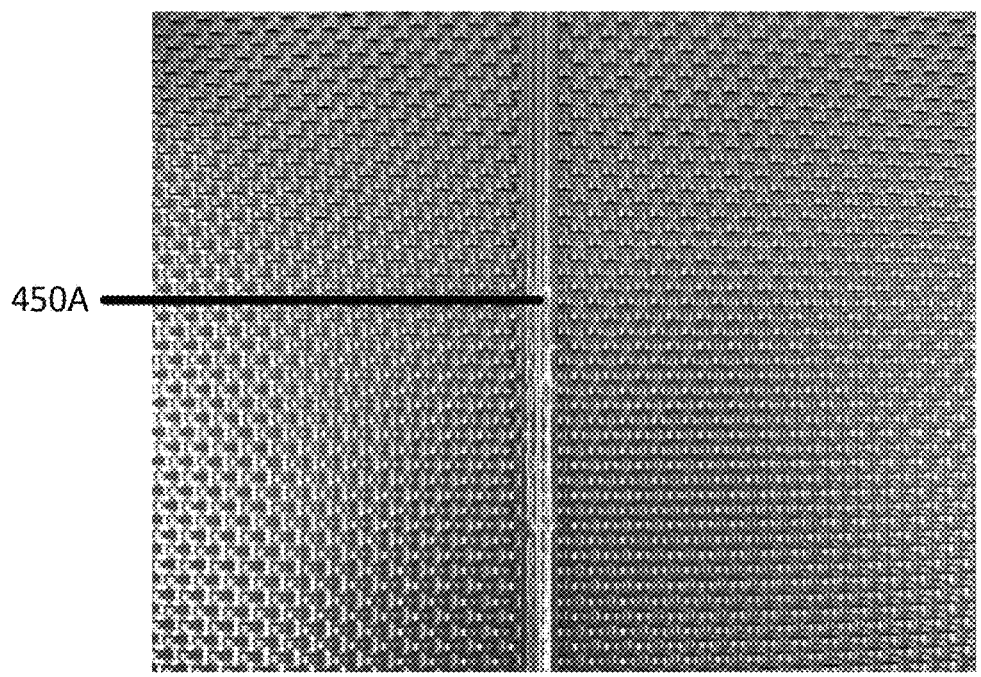
FIG. 9 is a photograph illustrating a barrier that divides the fuel cell of FIG. 4A into two areas for two-pass flow mixing.

A barrier 450A divides the fuel cell 400A into two separate areas (a first area 460A in which the fuel gas travels in the first direction and a second area 470A in which the fuel gas travels in the second direction). FIG. 9 is a photograph illustrating an example of the barrier 450A. In some aspects, there may be leakage between the first area 460A and the second area 470A. In other aspects, the barrier 450A hermetically seals the first area 460A and the second area 470A. The barrier 450A may be formed in several ways. For example, caulking materials (ceramic pastes) may be used to divide the first area 460A and the second area 470A. In another example, the barrier 450A may be formed of metal (e.g., stainless steel or any other metal typically used in a fuel cell, for example, a high temperature fuel cell). In yet another example, the barrier 450A may be formed by orienting the corrugations of the anode current collector in the areas in which less flow is desired, in such a way to produce high resistance (a pressure drop) to the flow of the gas.

In some aspects, every fuel cell in the stack undergoes the two-pass flow mixing of FIG. 4A in order to minimize the differences between the flow through each fuel cell (i.e., to achieve uniform flow distribution among the fuel cells). In some aspects, only some of the fuel cells in the stack undergo the two-pass flow mixing of FIG. 4A, for example, every other fuel cell or predetermined groups of fuel cells within the stack.

In some embodiments, such as that of FIG. 4B, at least one fuel cell 400B in the stack undergoes intra-cell one-pass flow mixing utilizing at least one obstacle 450B. The obstacle 450B may be an internal baffle 450B configured to restrain or otherwise regulate the flow of fuel gas within the fuel cell 400B. In the one-pass flow mixing of FIG. 4B, the fuel gas (anode gas) enters an inlet 410B at a first end of the fuel cell 400B (e.g., a first end of an anode current collector) and is output from an outlet 411B at a second end of the fuel cell 400B (e.g., a second end of the anode current collector), opposite to the first end. In FIG. 4B, the baffle 450B is illustrated generically as a broken line that generically represents any shape, size or number of baffles. The baffle(s) 450B (or any of the baffles described below) may be made, for example, of ceramic paste or metal (e.g., stainless steel or any other metal typically used in a fuel cell, for example, a high temperature fuel cell). The structure and placement of the baffle 450B will be described in further detail below. The baffle(s) 450B create an undulating flow path within the fuel cell 400B to achieve intra-cell mixing of the fuel gas. In some aspects, every fuel cell in the stack undergoes the one-pass flow mixing of FIG. 4B. In some aspects, only some of the fuel cells in the stack undergo the one-pass flow mixing of FIG. 4B, for example, every other fuel cell or predetermined groups of fuel cells within the stack.

In both FIGS. 4A and 4B, the fuel gas is mixed to break up the non-uniformity in concentration and/or temperature that would otherwise occur across the fuel cell during normal operation. Moreover, the embodiments of FIGS. 4A and 4B are not mutually exclusive. In some embodiments, both the two-pass flow mixing of FIG. 4A and the one-pass flow mixing of FIG. 4B may be utilized. Although the mixing techniques of FIGS. 4A and 4B illustrate the mixing of the fuel gas (anode gas), the concepts disclosed herein are not limited in this regard. In other embodiments, the two-pass flow mixing and the one-pass flow mixing may be used to mix the oxidant gas (cathode gas). In either the two-pass flow mixing or the one-pass flow mixing embodiment, the fuel cell may further include at least one dense loading zone, that is, an area in the fuel cell designed to have a higher pressure drop, thereby further inducing local turbulence of mixing. Such dense loading zones may be created, for example, by changing an orientation of the corrugations on the anode current collector or loading higher amounts of internal reforming catalyst in areas of the fuel cell.

Figure 5:
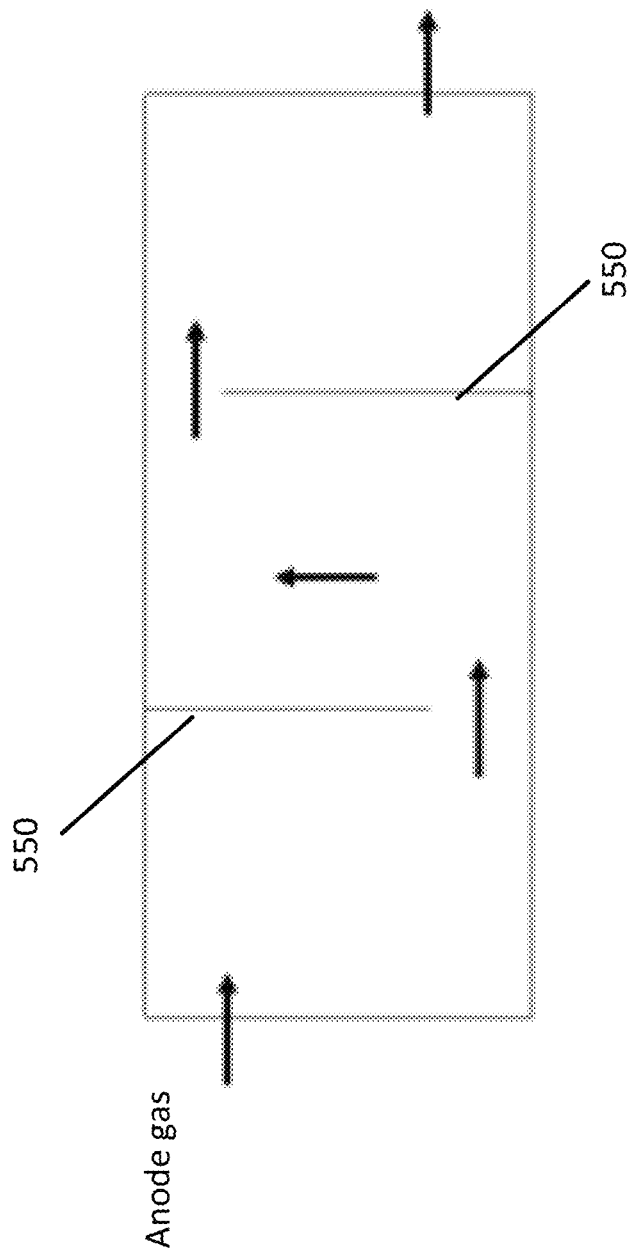
FIG. 5 illustrates one embodiment for carrying out the one-pass flow mixing of FIG. 4B.
Figure 7:
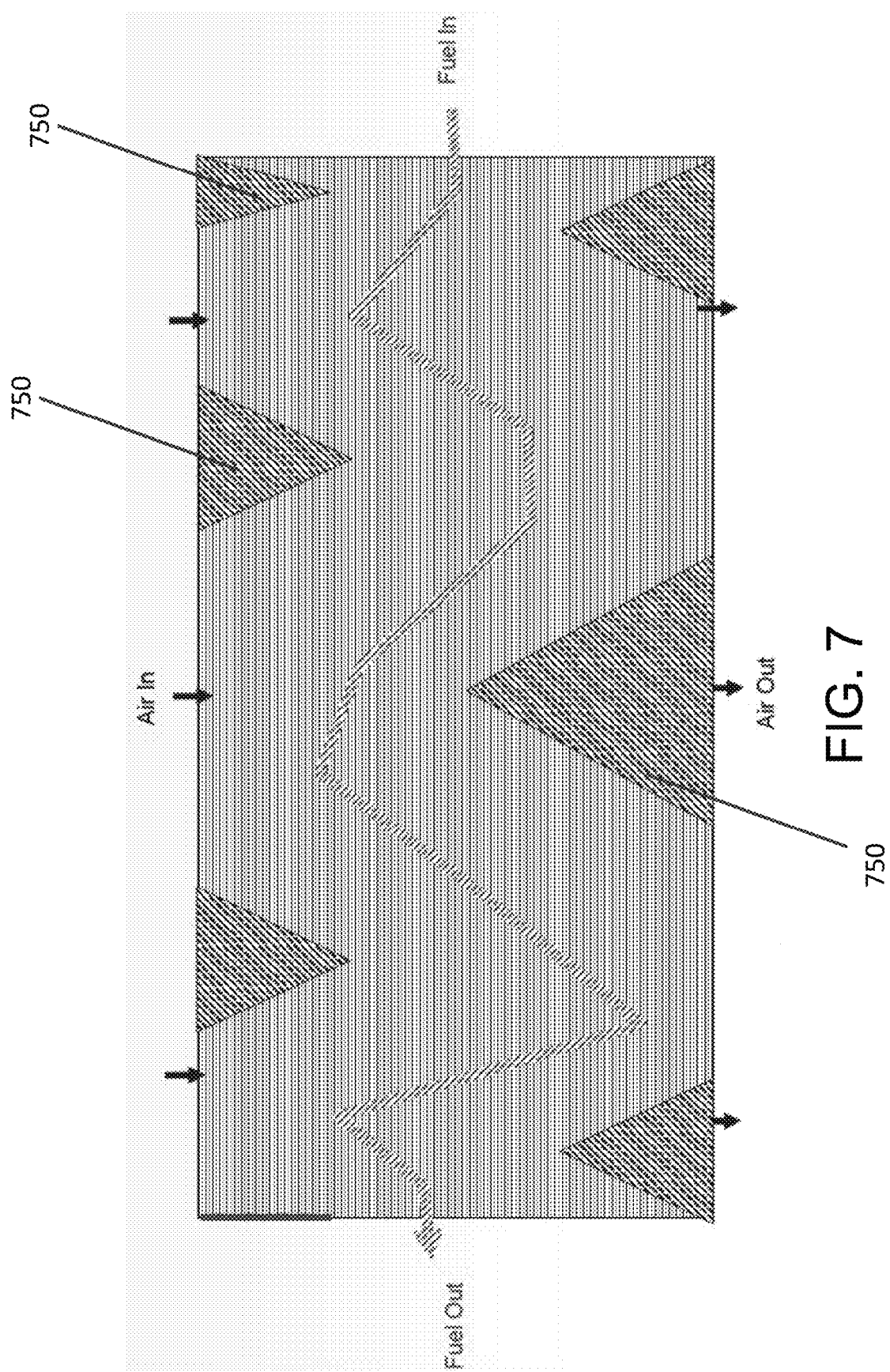
FIG. 7 illustrates yet another embodiment for carrying out the one-pass flow mixing of FIG. 4B.
Figure 8:
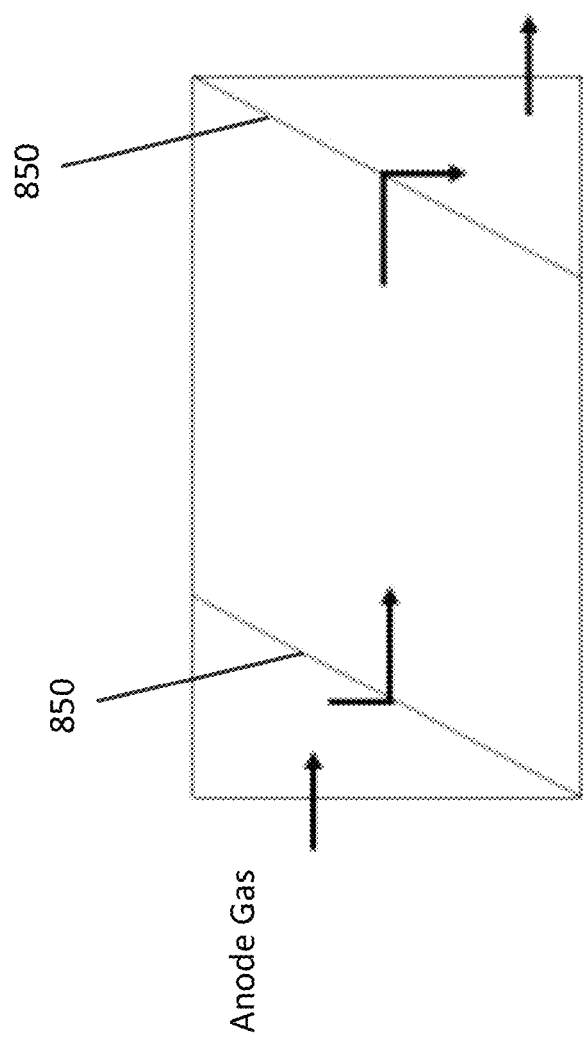
FIG. 8 illustrates an additional embodiment for carrying out the one-pass flow mixing of FIG. 4B.

The one-pass flow mixing is not limited to the use of a single baffle. Instead, referring to FIGS. 5-8, a plurality of baffles may be distributed along the fuel cell. In some aspects, all of the baffles are the same size (see baffles 550 of FIG. 5 or baffles 850 of FIG. 8), while in other aspects, the baffles may be different sizes (see baffles 650 of FIG. 6 and or baffles 750 of FIG. 7). In some aspects, the baffles may be evenly spaced or equidistant from one another (see FIG. 5), while in other aspects, at least some of the baffles may be unevenly spaced such that a larger distance exists between a first and a second baffle, than a distance that exists between a third baffle and the second baffle (see FIGS. 6 and 7). In some aspects, each of the baffles has a rectangular shape (see FIGS. 5 and 6), while in other aspects, each of the baffles has a non-rectangular shape, such as a triangular shape (see FIG. 7). In FIG. 8, the baffles are diagonal with respect to the first end and the second end of the fuel cell (see FIG. 4B), thereby creating a Z-pattern of gas flow. By altering at least one of the shape, size, or distance between baffles, a desired flow pattern, such as a step, wave or zig-zag flow pattern can be created for the fuel gas across the fuel cell. By changing the direction of flow of the fuel gas, intra-cell mixing is achieved.

Figure 10:
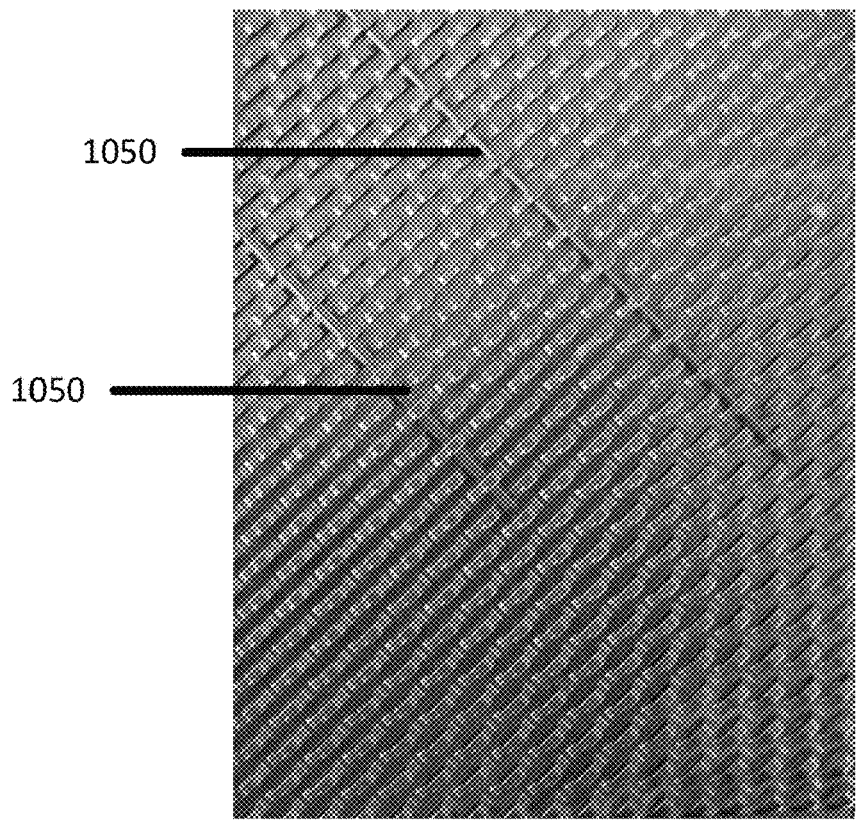
FIG. 10 is a photograph illustrating a baffle used to achieve the one-pass flow mixing of FIG. 4B.

In some aspects, the baffle(s) 1050 may be interwoven with the corrugations on the anode currently collector (see FIG. 10) such that the baffle 1050 is received within the protrusions and recesses of the corrugations. In other aspects, the baffle 1150 may be received in channels 1143 separating rows of corrugations (see FIG. 11). In the example of FIG. 11, the baffle 1150 is a flap formed of the anode current collector itself, as opposed to being formed of a ceramic paste or metal. In such aspects, corrugations in the anode current collector are flattened, L-shaped die cuts are made in the flattened areas to create flaps or upset segments, and the flaps or upset segments are folded out of the plane of the anode collector to the height of the corrugations of the anode current collector to form the baffle. One example of forming a baffle flap is described in U.S. Pat. No. 7,740,988, which is hereby incorporated by reference in its entirety. In further aspects, baffles formed of ceramic paste or metal can be provided in the channels between rows of corrugations, for example, at locations similar to the location of the baffle flaps 1150 in FIG. 11.

Areas of a fuel cell in which a baffle is located do not produce power. In other words, the addition of baffles may result in a loss of active fuel cell area. Thus, there may be a need to load a different catalyst pattern or adjust a concentration of catalyst in the fuel cell. In some embodiments, instead of forming a baffle from material such as ceramic paste, at least one obstacle may be formed in the reactant gas flow path, where the obstacle is made from concentrated catalyst. Like the baffle, the obstacle is configured to restrain or otherwise regulate the flow of reactant gas within the fuel cell. The obstacle may be formed and provided in shapes and sizes, or at distances with respect to one another, that are similar to those of the baffles in FIGS. 4B and 5-8.

Figure 12A:
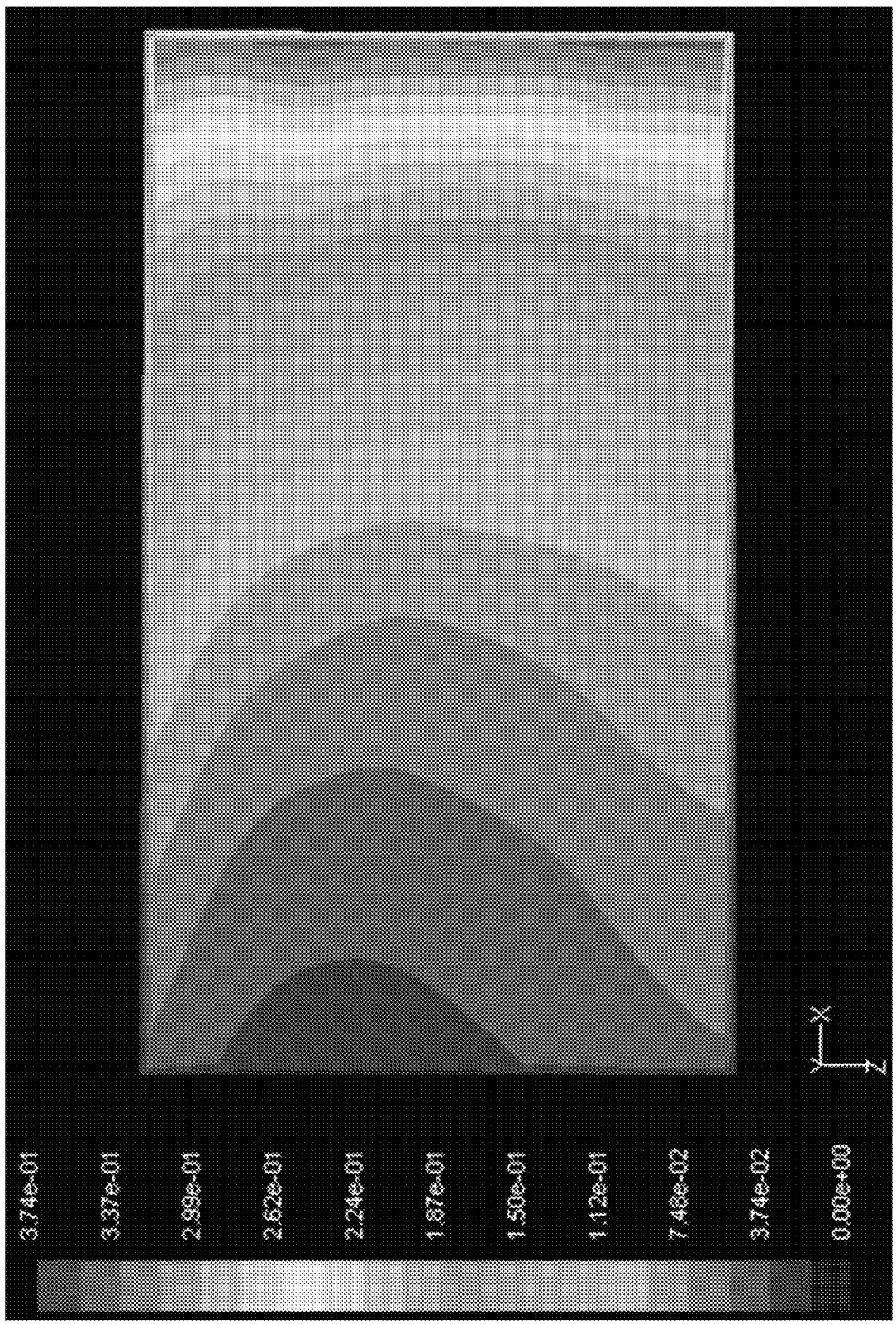
FIG. 12A illustrates a concentration of hydrogen across a fuel cell that does not include the one-pass flow mixing of FIG. 4B.
Figure 12B:
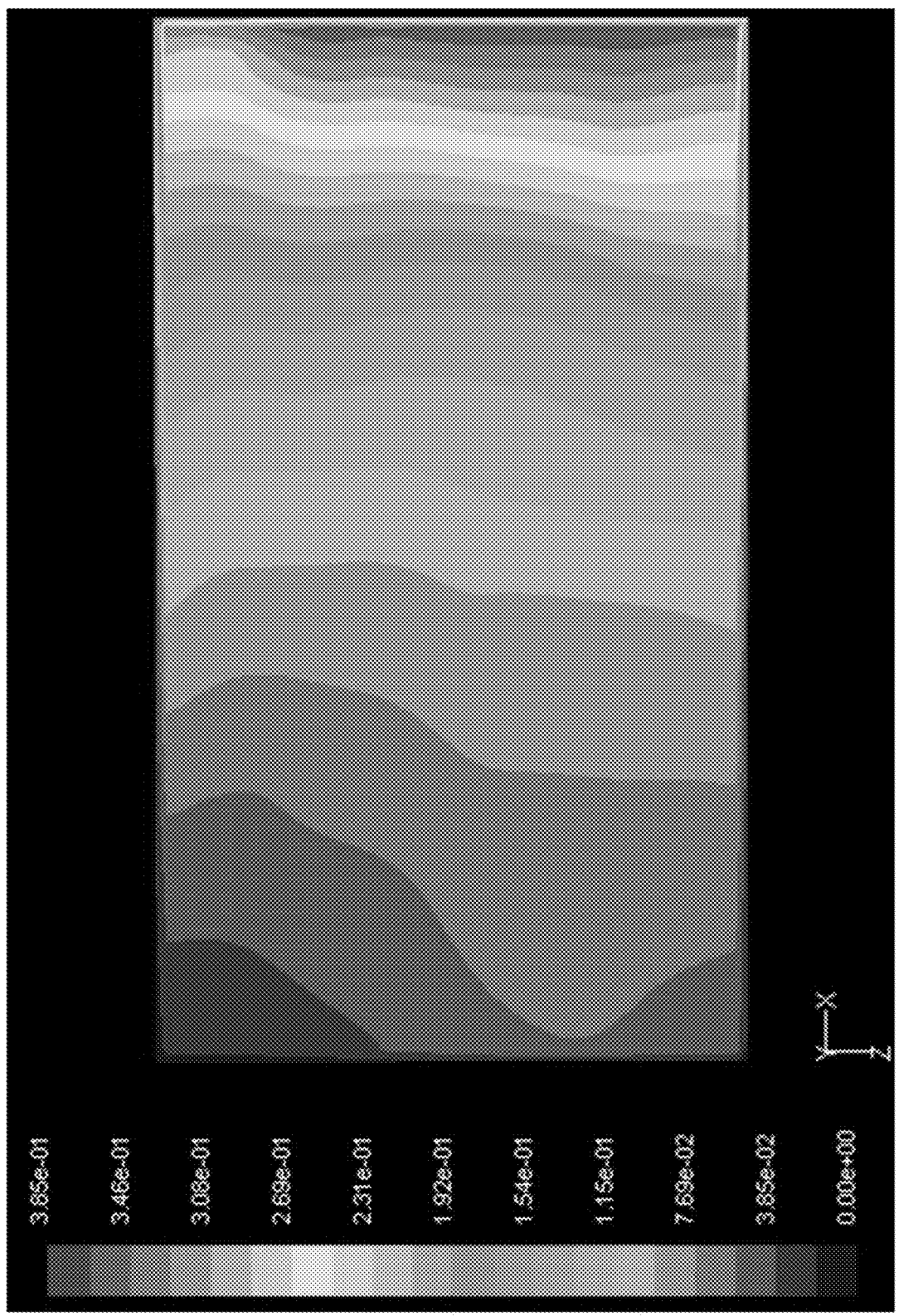
FIG. 12B illustrates a concentration of hydrogen across a fuel cell that includes the one-pass flow mixing of FIG. 4B. As compared to FIG. 12A, the hydrogen concentration has a flatter profile as it is reacted within an intra-mixed fuel cell.

FIGS. 12A and 12B illustrate a comparison of the fuel gas distribution across a fuel cell when the mixing techniques of FIGS. 4A and 4B are utilized. FIG. 12A illustrates the hydrogen (fuel gas) distribution across a fuel cell that is not subject to the mixing of FIGS. 4A and 4B, while FIG. 12B illustrates the hydrogen (fuel gas) distribution across a fuel cell subject to the one-pass flow mixing, in particular, the design of FIG. 6. Both FIGS. 12A and 12B illustrate the hydrogen distribution as a hydrogen concentration profile (mole fraction). As seen in comparing FIGS. 12A and 12B, the hydrogen distribution is better in a case of one-pass flow mixing the hydrogen gas. In addition, a flatter (more uniform) utilization profile is possible in a case of one-pass flow mixing the hydrogen gas. Therefore, the fuel cell of FIG. 12B is capable of operating at a higher fuel utilization, resulting in an increased efficiency of the system.

Figure 6:
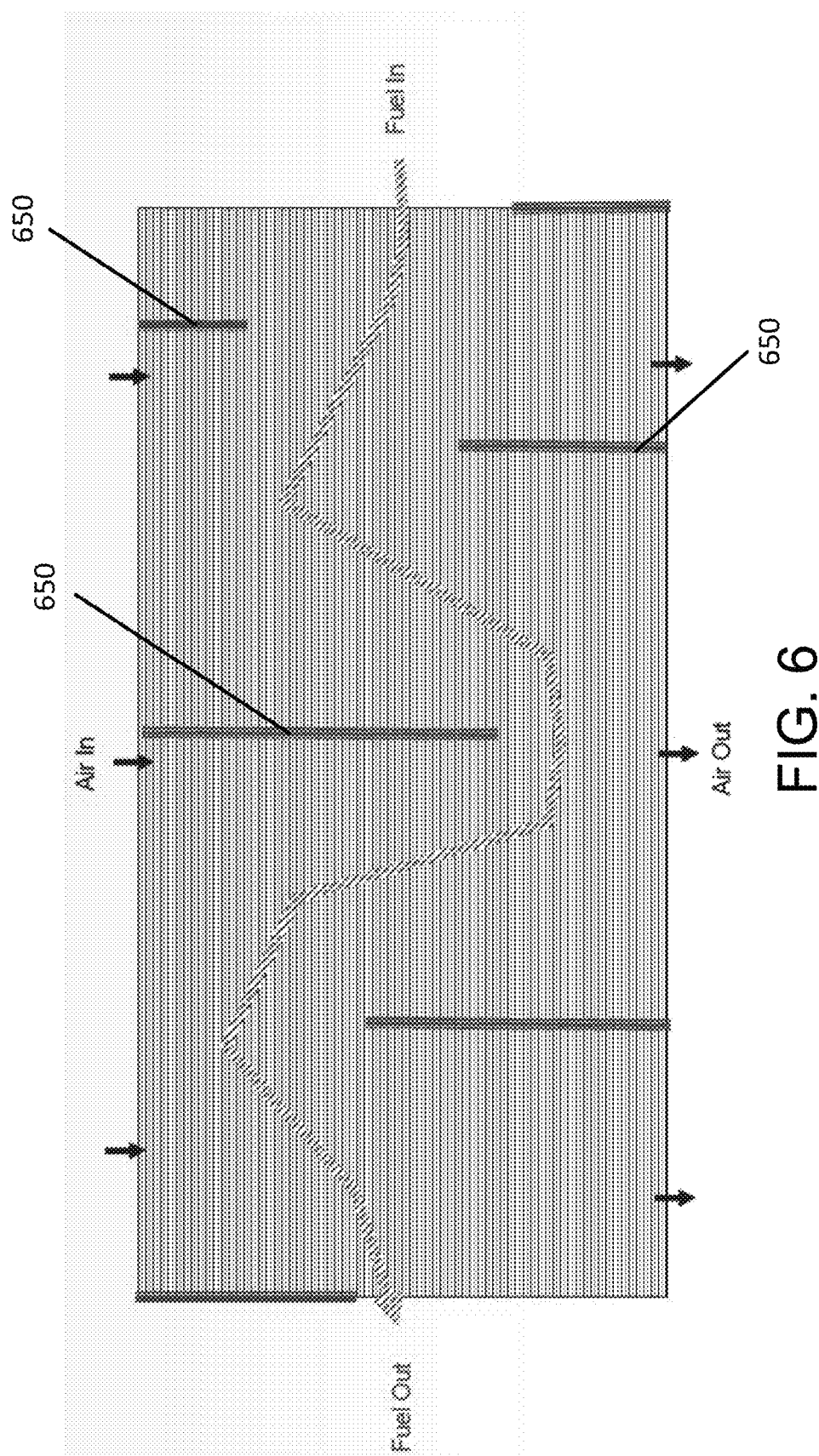
FIG. 6 illustrates another embodiment for carrying out the one-pass flow mixing of FIG. 4B.
Figure 13A:
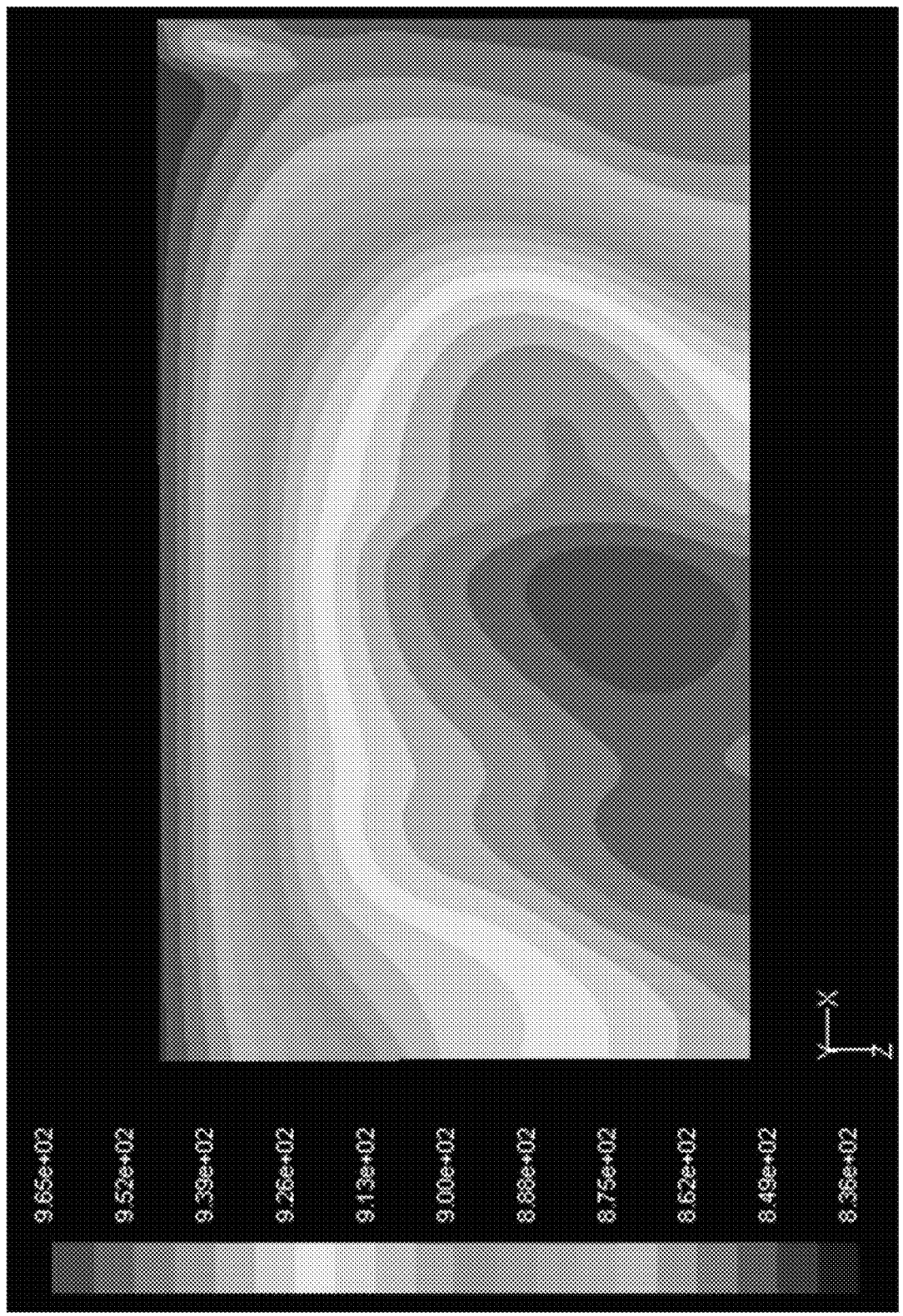
FIG. 13A illustrates a temperature distribution across a fuel cell that does not include the one-pass flow mixing of FIG. 4B.
Figure 13B:
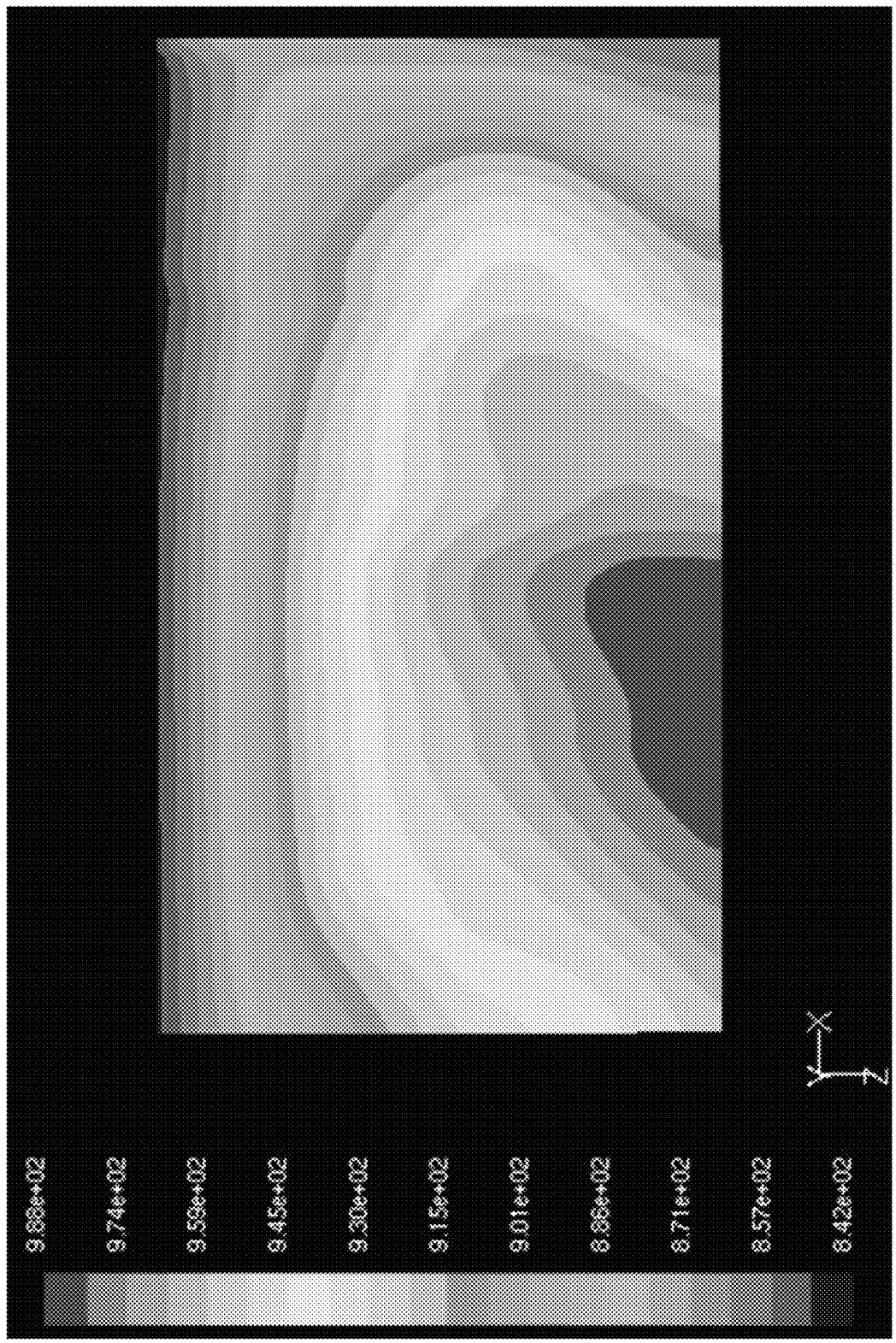
FIG. 13B illustrates a temperature distribution across a fuel cell that includes the one-pass flow mixing of FIG. 4B.
Figure 14A:
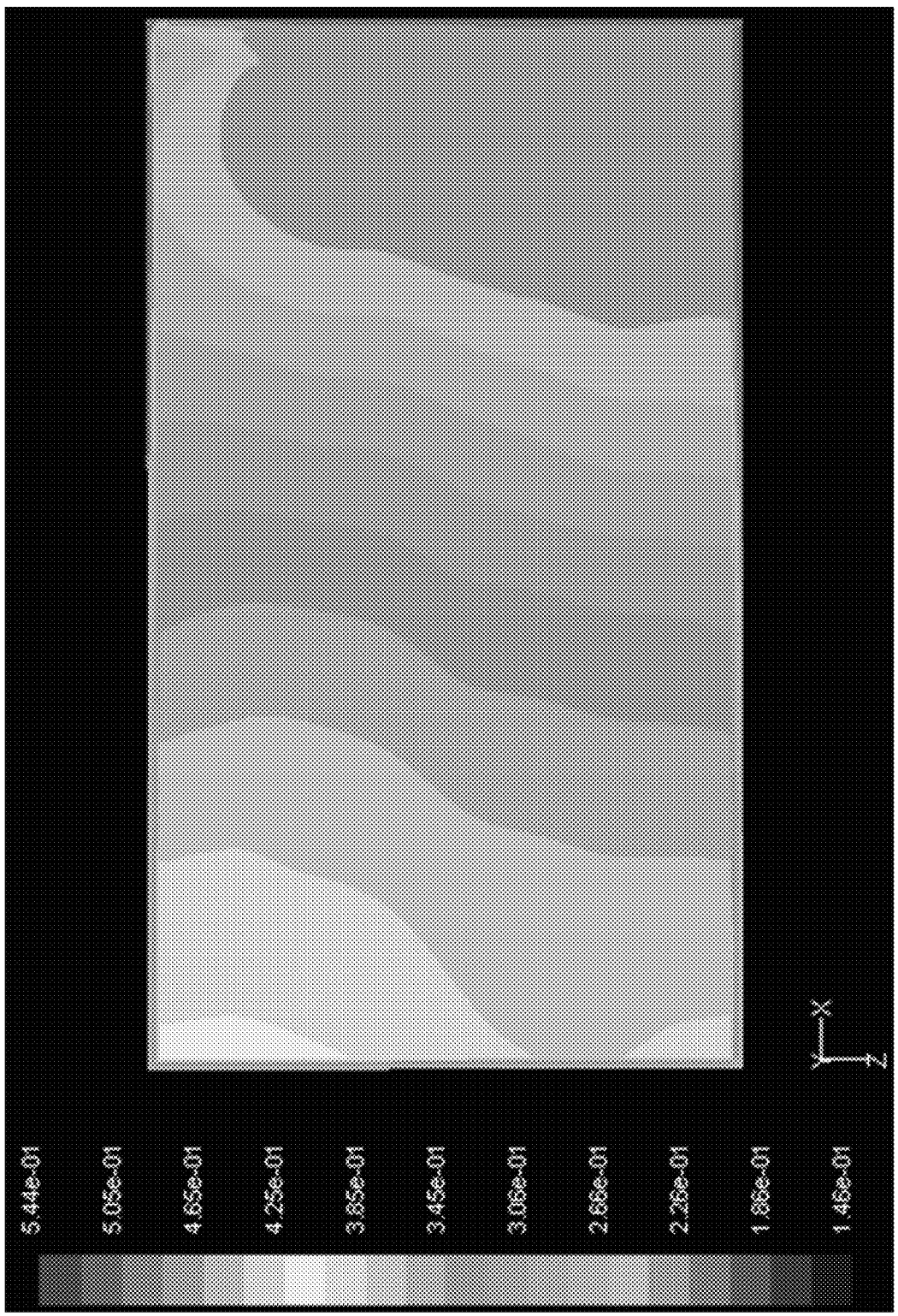
FIG. 14A illustrates a concentration (mole fractions) profile of water within the anode of the fuel cell with intra-cell mixing incorporated within the anode. The case shown is related to a fuel cell with internal reforming of the methane incorporated within the anode.
Figure 14B:
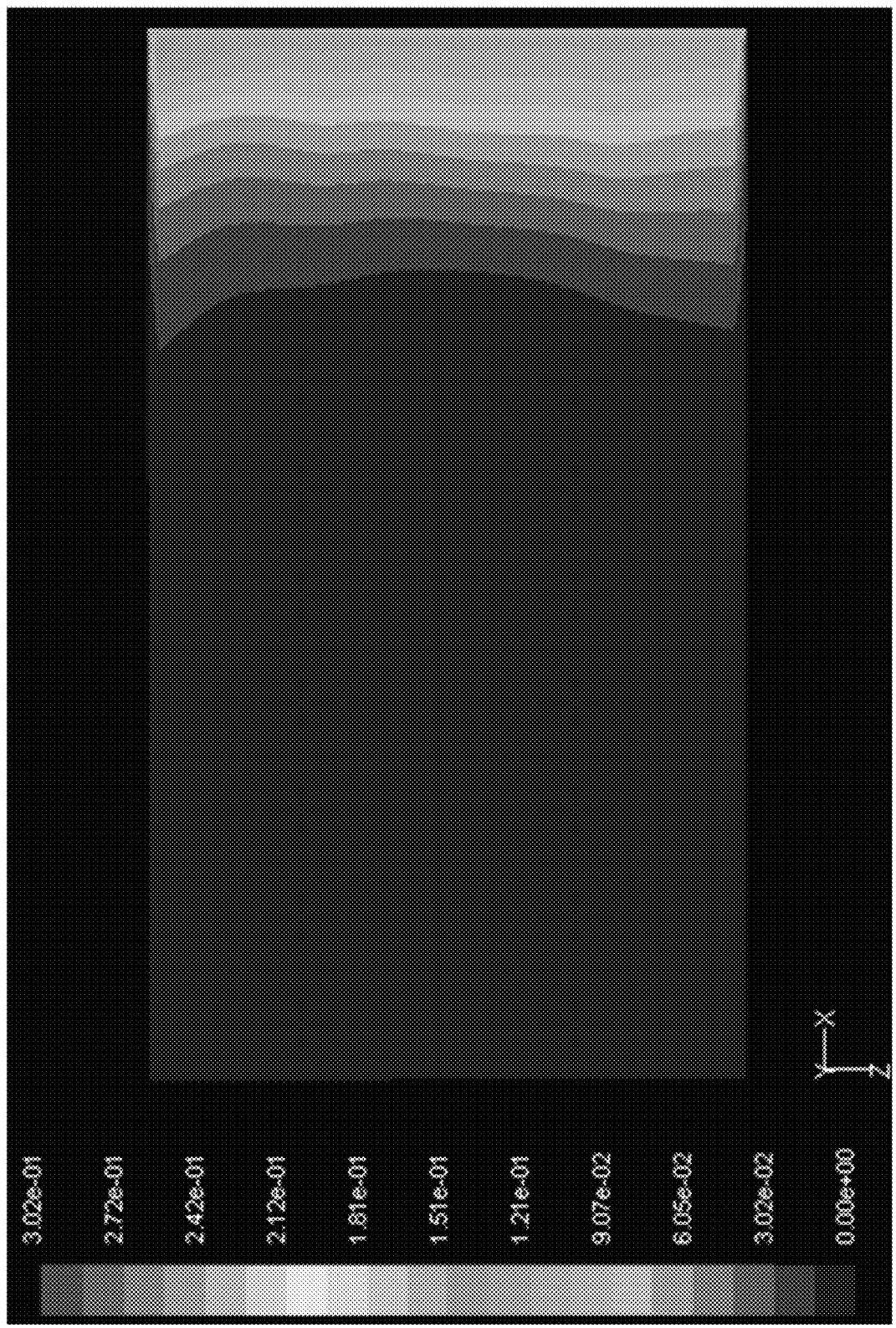
FIG. 14B illustrates a concentration (mole fractions) profile of methane within the anode of the fuel cell with intra-cell mixing incorporated within the anode. The case shown is related to a fuel cell with internal reforming of the methane incorporated within the anode.
Figure 14C:
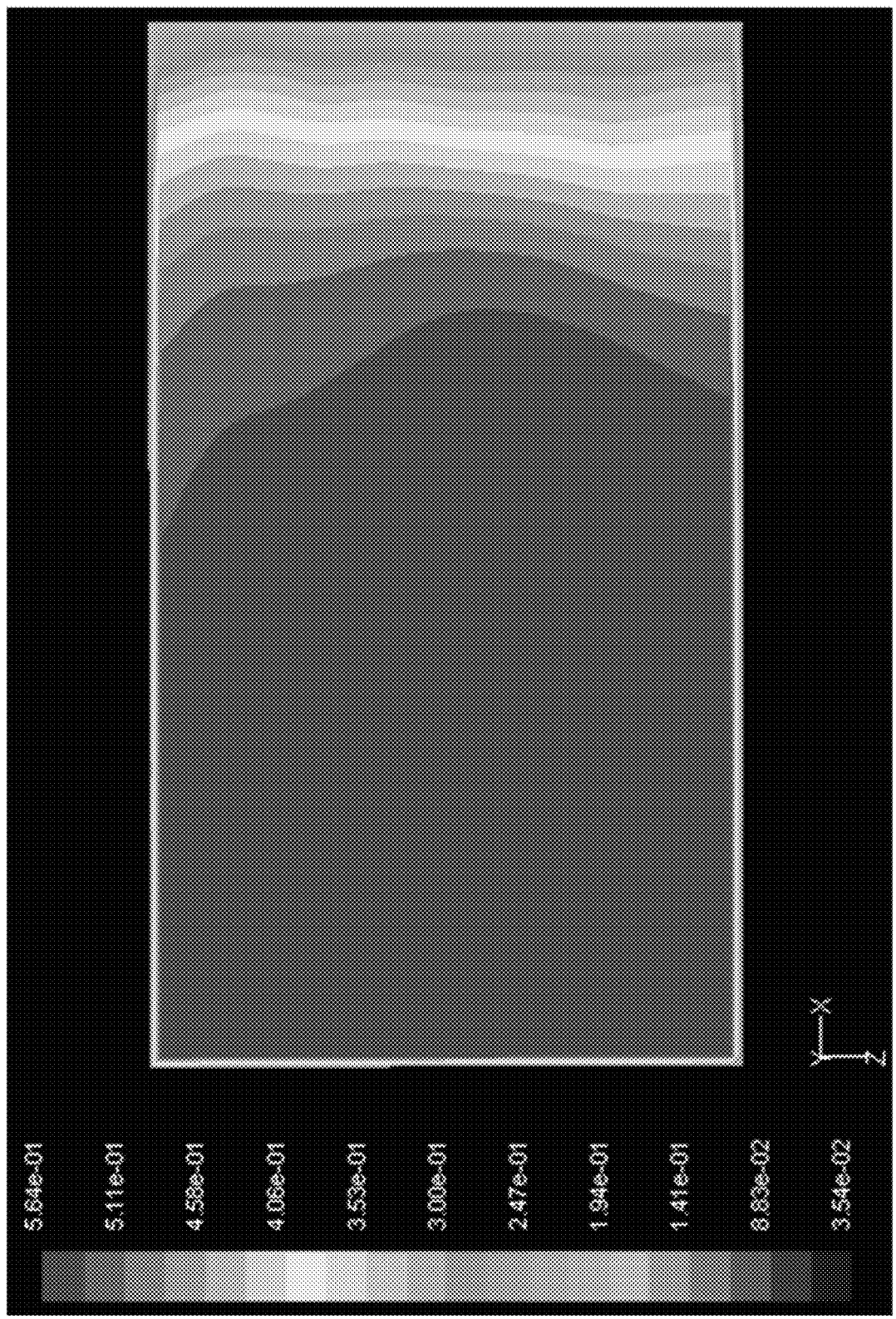
FIG. 14C illustrates a concentration (mole fractions) profile of hydrogen within the anode of the fuel cell with intra-cell mixing incorporated within the anode. The case shown is related to a fuel cell with internal reforming of the methane incorporated within the anode.
Figure 14D:
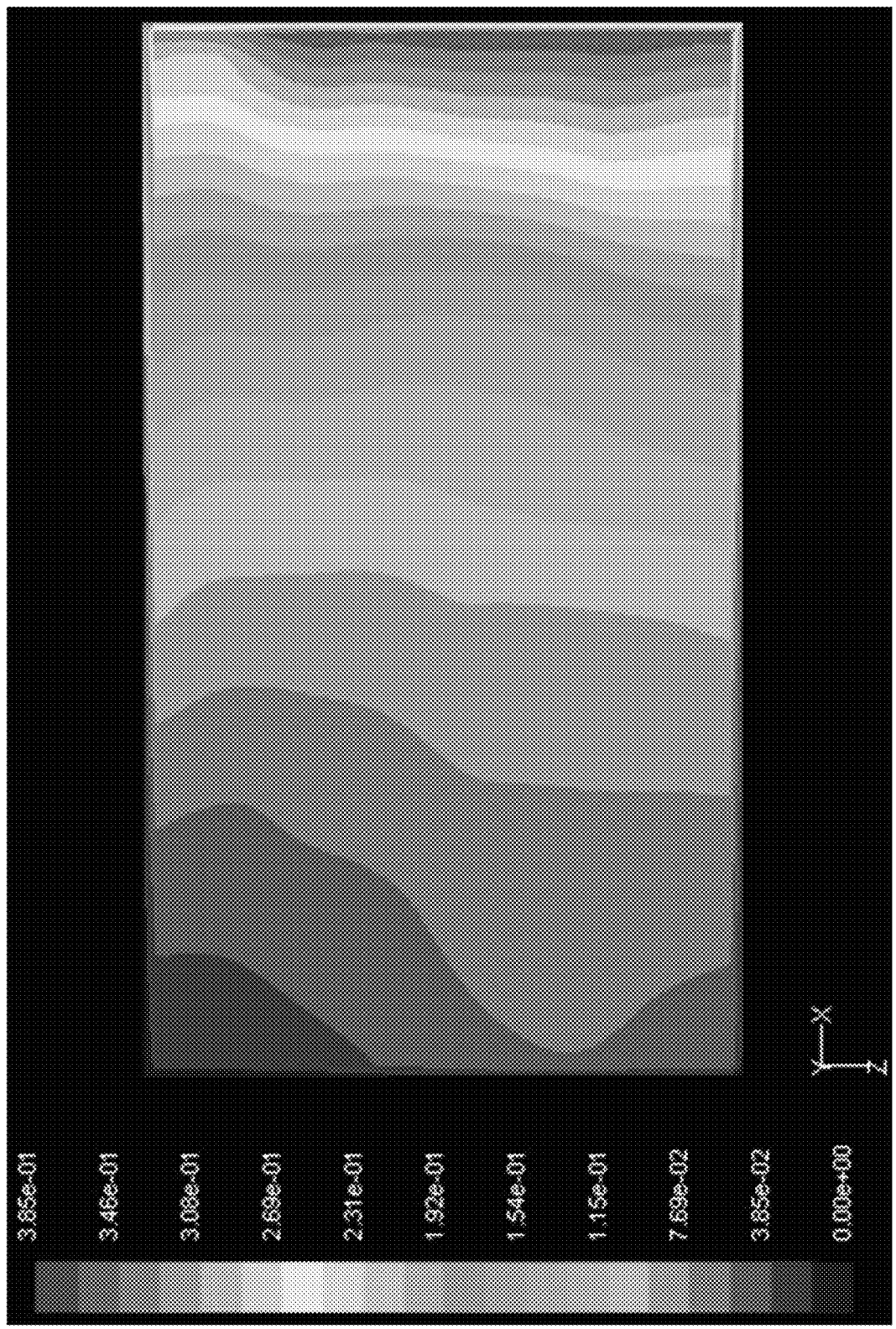
FIG. 14D illustrates a concentration (mole fractions) profile of carbon dioxide within the anode of the fuel cell with intra-cell mixing incorporated within the anode. The case shown is related to a fuel cell with internal reforming of the methane incorporated within the anode.

FIGS. 13A and 13B illustrate a comparison of the temperature distribution across a fuel cell when the one-pass flow mixing technique of FIG. 6 is utilized. FIG. 13A illustrates the temperature distribution across a fuel cell that is not subject to the one-pass flow mixing of FIG. 6, while FIG. 13B illustrates the temperature distribution across a fuel cell subject to the one-pass flow mixing. As seen in FIG. 13B, one-pass flow mixing heats up peripheral portions (especially corners) of the fuel cell such that a temperature gradient is reduced, and the life and performance of the fuel cell are improved.

FIGS. 14A-14D illustrate (clockwise from top-left corner) the concentration (mole fractions) profiles of water, methane, hydrogen, carbon dioxide within the anode of the fuel cell with intra-cell mixing incorporated within the anode. The case shown is related to a cell with internal reforming of the methane incorporated within the anode.

In an experiment, one stack including 30 fuel cells was built in a manner similar to that of the fuel cell system of FIG. 1 with the exception of the number of fuel cells. The stack was tested to evaluate the sustained fuel utilization using a conventional stack (no additional mixing). The fuel cell stack was used to mimic the effect of mixing of FIG. 4A, by flowing a simulated anode outlet gas constituent at the anode inlet (similar to running a second pass within the cell configuration). The results of the experiment indicated that the short stack that utilized intra-cell two-pass flow mixing achieved a sustained fuel utilization of greater than 85%. Models indicate that utilizing intra-cell two-pass flow mixing in full scale stacks (e.g. stacks with 400 fuel cells) will achieve a sustain fuel utilization of greater than 75% in power plants.

As discussed above, by implementing at least one of two-pass flow mixing (FIG. 4A) or one-pass flow mixing (FIG. 4B) within a fuel cell, concentration of a reactant gas in a fuel cell, especially at an outlet of the fuel cell, is more uniform than in a conventional fuel cell that does not include the mixing techniques. As a result, each of the fuel cells in the fuel cell stack operate the same way, having a uniform reactant gas distribution and temperature distribution pattern. The uniform gas distribution and temperature distribution patterns increase fuel utilization and efficiency.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The terms "attached," "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of concepts disclosed herein.

What is claimed is:
1. An anode for a fuel cell, the anode comprising:
  an anode current collector defining:
    an inlet configured to receive fuel gas;
    an outlet configured to output the fuel gas;
    a flow passage configured to allow a flow of fuel gas from the inlet to the outlet, the flow passage comprising:
      a plurality of first rows of corrugations forming a plurality of first protrusions; and a plurality of second rows of corrugations forming a plurality of second protrusions that are offset from the first protrusions in a first direction, wherein each of the first protrusions and each of the second protrusions includes an outer curved surface, an inner curved surface extending around an axis that extends in a second direction, and an opening defined by the inner curved surface and extending in the second direction; and a baffle extending lengthwise in the second direction (i) through the openings of respective first protrusions of the plurality of first rows and (ii) between respective pairs of adjacent second protrusions of the plurality of second rows, the baffle being configured to change a flow direction of the fuel gas in the flow passage to achieve intra-cell mixing of the fuel gas.

2. The anode of claim 1, wherein:

the inlet and the outlet are separately provided at a first end of the anode current collector such that the fuel gas enters and exits the anode current collector at the first end; and the anode further comprises a wall at a second end of the anode current collector opposite to the first end of the anode current collector.

3. The anode of claim 1, wherein the baffle is configured to create an undulating flow path within the flow passage.

4. The anode of claim 3, wherein the anode further comprises a plurality of baffles, each of the baffles having a same size and shape.

5. The anode of claim 3, wherein:

the anode further comprises a plurality of baffles; and at least one of the baffles has a different size or shape than another baffle.

6. The anode of claim 3, wherein the anode further comprises a plurality of equidistant baffles.

7. The anode of claim 3, wherein:

the anode further comprises a plurality of baffles; and a spacing between a first pair of adjacent baffles is different from a spacing between a second pair of adjacent baffles.

8. The anode of claim 1, wherein:

the anode further comprises catalyst pellets disposed within at least some of the corrugations.

9. The anode of claim 8, further comprising at least one baffle comprising a ceramic paste or metal strip.

10. The anode of claim 8, further comprising at least one baffle flap formed from a bent portion of the anode current collector.

11. A fuel cell comprising:

an anode;

a cathode; and an ion-conducting electrolyte sandwiched between the anode and the cathode;

wherein the anode comprises:

an anode current collector defining:

an inlet configured to receive fuel gas;

an outlet configured to output the fuel gas; and a flow passage configured to allow a flow of fuel gas from the inlet to the outlet, the flow passage comprising:

a plurality of first rows of corrugations forming a plurality of first protrusions; and a plurality of second rows of corrugations forming a plurality of second protrusions that are offset from the first protrusions in a first direction, wherein each of the first protrusions and each of the second protrusions includes an outer curved surface, an inner curved surface extending around an axis that extends in a second direction, and an opening defined by the inner curved surface and extending in the second direction; and a baffle extending lengthwise in the second direction (i) through the openings of respective first protrusions of the plurality of first rows and (ii) between respective pairs of adjacent second protrusions of the plurality of second rows, the baffle being configured to change a flow direction of the fuel gas in the flow passage to achieve intra-cell mixing of the fuel gas.

12. The fuel cell of claim 11, wherein the fuel cell is a molten carbonate fuel cell.

13. A method of supplying fuel gas to a fuel cell, the method comprising:

supplying the fuel gas to an inlet defined by an anode current collector;

flowing the fuel gas through a flow passage of the anode current collector, the flow passage comprising:

a plurality of first rows of corrugations forming a plurality of first protrusions; and a plurality of second rows of corrugations forming a plurality of second protrusions that are offset from the first protrusions in a first direction, wherein each of the first protrusions and each of the second protrusions includes an outer curved surface, an inner curved surface extending around an axis that extends in a second direction, and an opening defined by the inner curved surface and extending in the second direction;

changing a flow direction of the fuel gas within the anode current collector via a baffle extending lengthwise in the second direction (i) through the openings of respective first protrusions of the plurality of first rows and (ii) between respective pairs of adjacent second protrusions of the plurality of second rows to achieve intra-cell mixing of the fuel gas; and outputting the fuel gas from an outlet defined by the anode current collector.

14. The method of claim 13, wherein:

changing the flow direction of the fuel gas comprises creating an undulating flow path within the flow passage.

* * * * *